United States Patent

Viano

Patent Number: 5,295,729
Date of Patent: Mar. 22, 1994

[54] HIGH RETENTION SEAT BACK

[75] Inventor: David C. Viano, Bloomfield Hills, Mich.

[73] Assignee: General Motors Corporation, Detroit, Mich.

[21] Appl. No.: 838,184

[22] Filed: Feb. 18, 1992

[51] Int. Cl.⁵ .................................. B60N 2/42
[52] U.S. Cl. ..................... 297/216.14; 297/216.18
[58] Field of Search ................... 297/216, 472, 354

[56] References Cited

U.S. PATENT DOCUMENTS

| | | | |
|---|---|---|---|
| 2,682,931 | 7/1954 | Young | 188/1 |
| 2,735,476 | 2/1956 | Fieber | 155/9 |
| 2,823,730 | 2/1958 | Lawrence | 155/9 |
| 3,269,774 | 8/1966 | Hildebrandt et al. | 297/386 |
| 3,471,197 | 10/1969 | Ely | 297/216 |
| 3,552,795 | 1/1971 | Perkins | 297/216 |
| 3,578,376 | 5/1971 | Hasegawa et al. | 296/65 |
| 3,734,562 | 5/1973 | Fourrey | 297/216 |
| 3,806,190 | 4/1974 | Winslow | 297/216 |
| 3,832,002 | 8/1974 | Eggert, Jr. et al. | 297/216 |
| 3,853,298 | 12/1974 | Libkie et al. | 248/429 |
| 3,957,304 | 5/1976 | Koutsky et al. | 297/385 |
| 4,183,582 | 1/1980 | Taki | 297/216 |
| 4,325,238 | 4/1982 | Scherbing | 70/18 |
| 4,349,167 | 9/1982 | Reilly | 297/216 |
| 4,390,208 | 6/1983 | Widmer et al. | 297/216 |
| 4,488,754 | 12/1984 | Heesch et al. | 297/216 |
| 4,775,182 | 10/1988 | von Hoffman | 297/45 |
| 4,824,171 | 4/1989 | Hollingsworth | 297/351 |

Primary Examiner—Peter M. Cuomo
Assistant Examiner—Darnell M. Boucher
Attorney, Agent, or Firm—William A. Schuetz

[57] ABSTRACT

A high retention seat assembly has a seat cushion unit and a back rest unit which moves rearwardly relative to the seat cushion unit when subjected to severe loading by the occupant during a rear collision. A collapsible retention connected with the seat cushion unit and back rest unit is tensioned or pulled taut in response to rearward movement of the back rest unit relative to the seat cushion unit to limit rearward deflection of the back rest unit during such a rear collision.

10 Claims, 5 Drawing Sheets

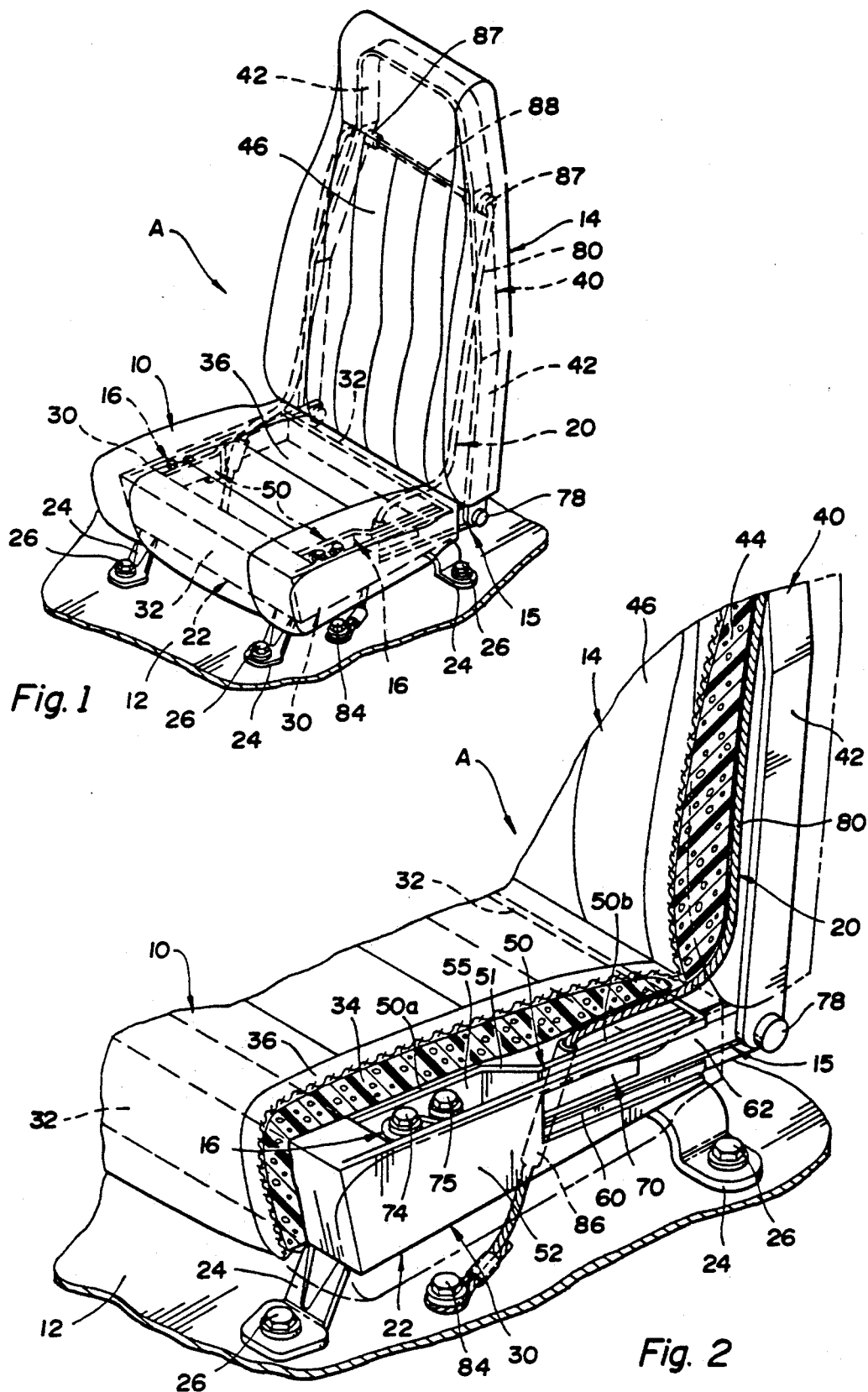

HIGH RETENTION SEAT BACK

The present invention relates to a vehicle seat assembly and, more particularly, to a high retention vehicle seat assembly having a back rest unit which moves rearwardly when subjected to severe loading by the occupant during a rear collision to tension a retention means or wire to limit rearward deflection of the back rest unit.

Conventional vehicle seat assemblies usually comprise a seat cushion unit and a back rest unit. The seat cushion unit includes a seat cushion frame which is either mounted directly to the vehicle floor or mounted to the vehicle floor via a suitable seat adjuster mechanism so that the position of the seat assembly can be adjusted. The back rest unit usually includes a back rest frame which is either rigidly mounted to the seat unit frame via bolts or other suitable fasteners if the back rest unit is to be a non-foldable unit, or is pivotally connected to the seat frame of the seat cushion unit via pivots for folding movement about a horizontal axis to enable the seat back unit to be folded forwardly to permit ingress and egress of vehicle occupants. The back rest unit could also be pivotally connected to the seat cushion unit via a pivotal recliner mechanism which allows the back rest to be both folded forwardly across the seat cushion unit and moved rearwardly to a reclined position. In these conventional set assemblies, the back rest unit has a normal upright position in which it is disposed at approximately a 25° acute angle with respect to a vertical plane passing through the pivot means for the back rest unit.

When a vehicle is subjected to a collision from its rear end and accelerated forward, an occupant seated in the vehicle seat assembly tends to move rearwardly relative to the vehicle's interior and imposes a load against the back rest unit. If the rear end collision is severe enough, the load imposed against the back rest unit becomes severe and tends to cause the back rest unit to be deflected rearwardly from its normal upright position by twisting or rotating about its pivotal connection with the seat cushion unit and/or due to bending of the back rest frame in a rearward direction. Some rearward deflection of the seat back unit, however, is desirable during a rear end collision since it tends to absorb energy.

It is known that good retention of the occupant in a seat occurs even if the seat back unit thereof deflects rearwardly to a position of a substantial angle from a vertical plane passing through its pivotal connection with the seat unit. This is because the friction forces between the occupant and the vehicle seat back exceed the forces tending to ramp the occupant rearwardly over the seat back unit. However, at angles greater than a substantial angle from the vertical the occupant tends to ramp rearwardly and off the seat assembly, especially if the occupant is not wearing a seat belt. It should be noted that the latter condition only occurs in extremely severe rear end collisions, i.e., collisions in which the vehicle is rammed from the rear at a very high speed.

Accordingly, it is a broad object of the present invention to provide a new and improved vehicle seat assembly in which the back rest unit is connected to the seat cushion unit via an energy absorbing means which allows the back rest unit to be moved rearwardly relative to the seat cushion unit when the vehicle is subjected to a severe rear end collision and which includes a seat back retention means which prevents or limits rearward rotation of the back rest unit about its connection with the seat cushion unit.

Another object of the present invention is to provide a new and improved seat assembly in which a seat back unit is connected to a seat unit via an energy absorbing means which allows the seat back unit to be moved rearwardly relative to the seat unit to absorb energy when an occupant imposes a load against the back rest unit in excess of a predetermined magnitude upon the vehicle being subjected to a severe rear end collision and wherein a normally collapsed collapsible retainer means connected with a fixed support, such as the seat cushion unit, and with the back rest unit becomes taut to provide a triangulated support when the back rest unit moves rearwardly relative to the seat unit to limit rearward deflection of the back rest unit about its connection with the seat cushion unit via the energy absorbing means.

Another object of the present invention is to provide a new and improved seat assembly, as defined in the preceding object, and wherein the collapsible retainer means is attached to the seat back unit at a location above the center of the occupant loading against the seat back.

Yet another object of the present invention is to provide a new and improved seat assembly, as defined in the preceding objects, and wherein the collapsible retainer means is a wire, preferably a plastic coated braided metal wire, which normally lies along the sides of the seat back and seat cushion units when in its collapsed position, but which becomes taut when the seat back unit is moved rearwardly relative to the seat unit to limit rearward deflection of the seat back unit.

A further object of the present invention is to provide a new and improved seat assembly, as defined in the preceding objects, and wherein the energy absorbing means allows the back rest unit to be linearly moved horizontally or in a curved trajectory rearward from the seat cushion unit to increase the distance between the connections of the collapsible retainer at the seat back and the seat cushion units.

An additional object of the present invention is to provide a new and improved seat assembly, as defined in the preceding objects, and wherein the seat back unit is pivotally connected to the seat cushion unit via levers to allow rearward movement of the seat back unit in an arc about the pivotal connection of the levers to the seat cushion unit.

A still further object of the present invention is to provide a new and improved seat assembly, as defined in the preceding objects, and wherein the length of the retention means or wire between its connection with the seat back unit and the fixed support is such that it becomes taut upon rearward movement of the back rest unit so that no significant rearward deflection of the back rest unit about its pivotal connection with the seat cushion unit occurs.

Yet another object of the present invention is to provide a new and improved seat assembly, as defined in all but the last preceding object, and wherein the length of the retention means or wire between its connection with the seat back unit and the fixed support is such that it does not become taut until rearward displacement of the seat back rest pivot and rearward deflection of the back rest unit about its pivotal connection with the seat cushion unit from its normal upright position reaches a predetermined displacement and angular extent.

Yet another object of the present invention is to provide a new and improved seat assembly wherein the length of the collapsible retention means or wire between its connection with the seat back unit and the fixed support is such that it does not become taut until a mechanical or pyrotechnic means of stored energy is engaged or actuated during a sufficiently severe rear end crash to draw up the slack in the normally collapsed collapsible retention means or wire to a taut position to limit rearward deflection of the seat back rest unit.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which:

FIG. 1 is a perspective view of the novel seat assembly of the present invention and showing the same mounted to a vehicle floor;

FIG. 2 is a fragmentary enlarged perspective view of the seat assembly shown in FIG. 1 and showing portions thereof cut away and in cross section;

Figure 3:
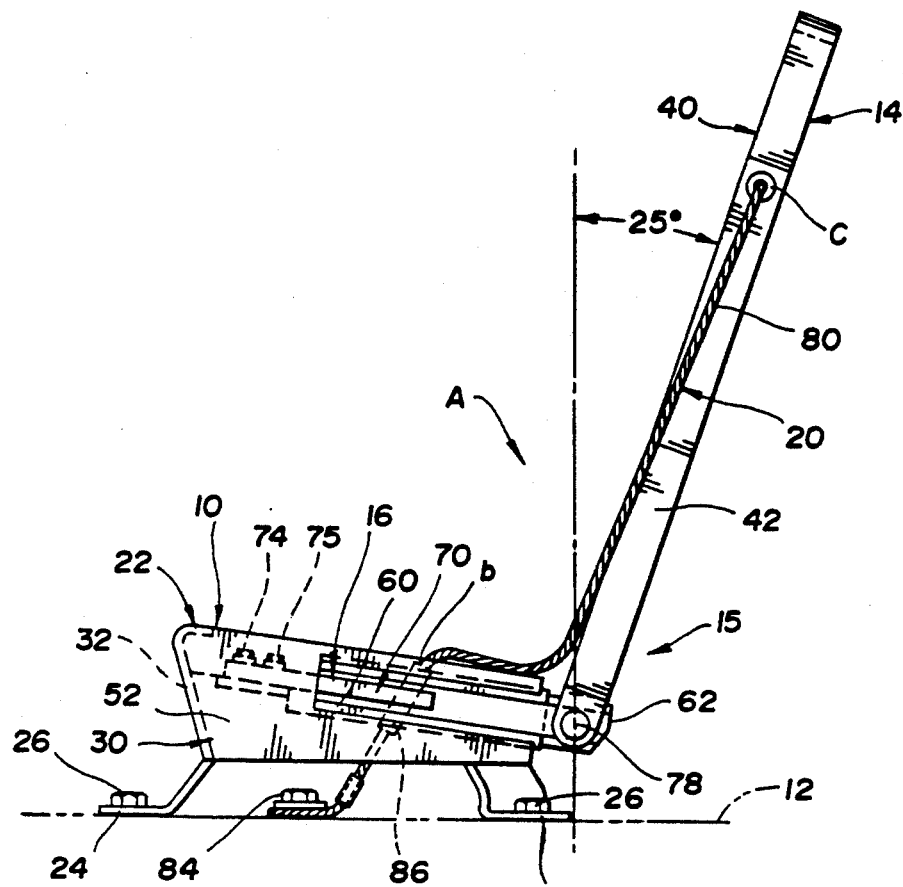
FIG. 3 is a side elevational view of the seat assembly shown in FIG. 1 but with the cushion and trim materials removed and with the seat back frame in its normal upright position.

Referring to FIGS. 1-4 of the drawings, the present invention provides a novel seat assembly A for use in automotive vehicles. The seat assembly A comprises, in general, a seat cushion unit 10 which is adapted to be mounted to a vehicle floor 12, a back rest unit 14, a support means 15 including an energy absorbing means 16 carried by the seat cushion unit 10 at each side and connected with the back rest unit 14 for supporting the back rest unit 14 in a normal upright position and for maintaining the back rest unit 14 in a first position relative to the seat cushion 10 during usual operating conditions of the vehicle, but which moves rearwardly toward a second position during a rear end collision, and a collapsible retention means 20 operatively connected to the back rest unit 14 and to a fixed support, either the vehicle floor 12 or the seat cushion unit 10, for retaining the back rest unit 14 in an upright position in the event of a severe rear end collision.

The seat cushion unit 10 comprises a suitable frame means 22 which includes a plurality of depending legs 24 which are secured to the vehicle floor 12 via bolts 26. The frame 22 could be of any suitable or conventional construction, but preferably is of a generally rectangular shape. The frame 22 includes a pair of spaced side supports 30 interconnected by a plurality of cross members 32 proceeding from the front to the rear of the seat. The seat cushion unit 10 also includes a suitable foam cushion 34 secured to the frame 22 and a suitable trim cover 36 covering the foam cushion 34.

The back rest unit 14 comprises an inverted U-shaped flat metal or tubular frame 40 having a pair of sides 42 which are interconnected by a plurality of cross members (not shown). The back rest unit also includes a foam cushion 44 which is secured to the back frame 42 and which is covered by a suitable trim cover 46.

Figure 5:
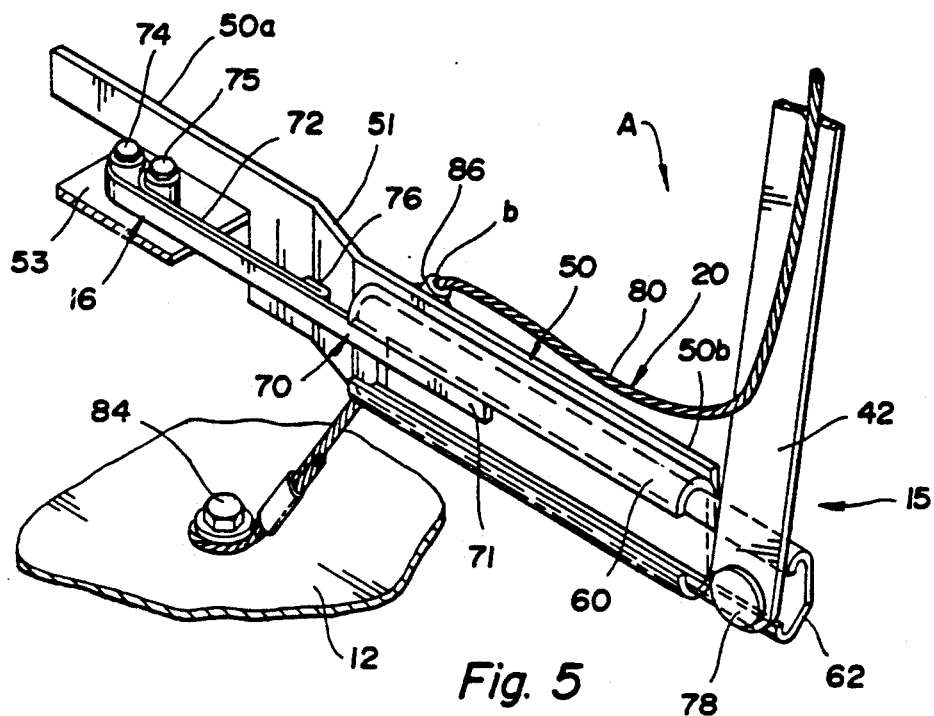
FIG. 5 is a fragmentary perspective view of part of the seat assembly shown in FIG. 3 and illustrating the position of the energy absorbing means when the seat back is in its normal upright position.

The back rest unit 14 is suitably supported by the support means 15 at each side of the seat cushion unit 10. The support means 15, as best shown in FIGS. 2 and 5, includes the side supports 30 of the seat frame 22. The side supports each comprise an inner wall 50 and a spaced outer wall 52. The inner wall 50 is suitably bent or formed as indicated at 51 so that its forward portion 50a is located further inwardly from the side of the seat cushion unit 10 than its rearward portion 50b. Integrally formed with the forward portion 50a of the inner wall 50 is a horizontally extending bracket or shelf 53 (see FIG. 5). The outer wall 52 is suitably welded to the shelf 53 and extends along the forward portion of the seat cushion unit 10 to an extent substantially equal to that of the forward portion 50a of the inner wall 50. The laterally spaced forward portion 50a of the inner wall 50 and the outer wall 52 define a compartment 55, and for a reason to be hereinafter more fully described. The rearward portion 50b of the inner wall 50 of the side support 30 has suitably welded or otherwise secured thereto a generally linear horizontally extending channel 60. The channel 60, as viewed in FIG. 5, is C-shaped in cross section and slidably supports a complimentary shaped slide 62 for horizontal linear movement relative thereto.

The energy absorbing means 16 connects the slide 62 to the inner wall 50 of the side support 30. The energy absorbing means 16 comprises a metal steel strip 70 having one end 71 welded or otherwise secured to the slide 62 and its other end portion 72 reversely bent to extend along its back side. As shown in FIG. 5, the strip 70 is trained and bent about a pair of spaced pivotal rollers or pivots 74, 75 carried by the shelf 53 of the inner wall 50. The rollers 74, 75 are slightly spaced from one another and the metal strip 70 has its reversely bent portion 72 trained around the forward most roller 74 and between the rollers 74, 75 so as to extend along the back side of the strip 70 while in pressure engagement with the the roller 75. The reversely bent portion 72 of the strip 70 at its free end is again reversely bent to provide a stop 76. The portion 72 of the strip 70 preferably is tapered so that its width progressively decreases proceeding from the stop 76 toward the roller 75.

The sides 42 of the back rest frame 40 are adapted to be connected at their lower ends to the slides 62. To this end, the lower end of the sides 42 of the frame 40 of the back rest 14 are suitably bolted or pivotally connected to the slide 62 at its rearward most end portion via a bolt or pivot 78. The back rest unit could be fixably connected to the slide 62 of the seat cushion unit if the back rest is to be of the non-foldable type or it could be suitably pivotally connected to the rearward end portion of the slide 62 if the back rest 14 is to be folded forwardly over the seat cushion unit 10 to permit entry into the vehicle. In addition, the side arms 42 of the back rest unit 14 could be suitably pivotally connected to the slide 62 of the seat cushion unit via a suitable pivotal recliner mechanism so as to enable the back rest unit to not only be foldable forwardly over the seat unit, but also to be reclined rearwardly for comfort. For purposes of illustration and description, the back rest unit 14 will hereinafter be described with reference to the fact that it is a foldable back rest unit and thus, is pivotally connected to the slides 62 via the pivot means 78 at each side of the back rest unit 14 for pivotal movement about the horizontal axes of the pivots 78.

The seat back retention means 20 for limiting rearward deflection of the seat back unit rearwardly about the pivot means 78 comprises a collapsible means or member 80, preferably a plastic coated metal braided wire. The wire 80 comprises a one piece member having its opposite ends secured to a fixed support, here shown as the floor panel 12 of the automotive vehicle via bolts 84. The wire 80 could also be anchored to a fixed or stationary part of the seat frame 22. From the floor 12 the wire 80 extends upwardly through a ferrule 86 secured to the inner wall 50 of the seat side support 30 and from the ferrule 86 extends along the side of the seat cushion unit 10 and then up along the side of the back rest unit 14. The wire 80 is connected to the back rest unit 14 through openings 87 in the sides 42 and through a tubular member 88 extending between the sides 42. The wire 80 is normally in a collapsed or slack condition, as shown in FIGS. 1-3 in the drawings. The wire 80 would be hidden from view by being located beneath the trim covers 36 and 46 of the seat unit 10 and the back rest unit 14.

The wire 80 in its collapsed condition along the sides of the seat assembly A has a length which is greater than the distance between its connection b with the ferrule of the seat cushion unit and its connection C at the openings 87 in the sides 42 of the back rest unit 14.

The support means 15 including the energy absorbing means 16 functions to normally maintain and support the back rest unit 14 in a normal upright position, as shown in FIGS. 1-3, and to maintain the back rest unit 14 in a first or forward position relative to the seat cushion unit 10 during all usual and normal operating conditions of the vehicle. As shown in FIG. 3, when the back rest unit 14 is in its normal upright position, it lies in a plane which forms an approximately 25° acute angle with an imaginary vertical plane passing through the pivot means 78.

Figure 4:
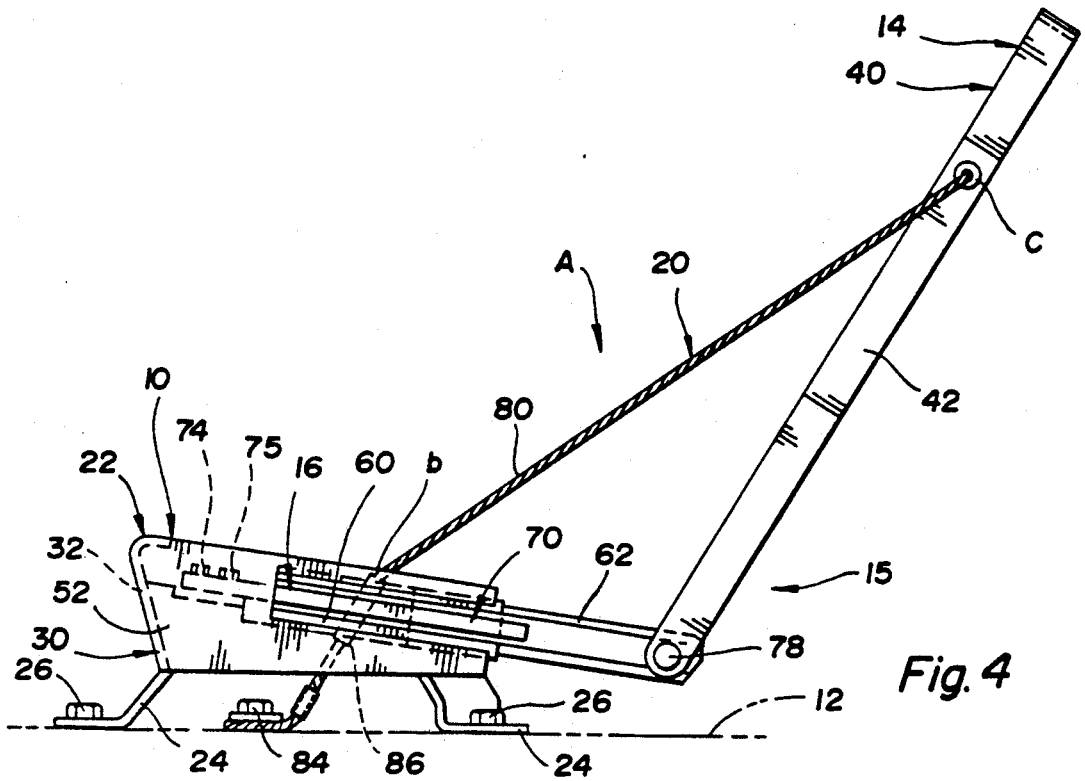
FIG. 4 is a view like that shown in FIG. 3, but showing the position of the seat back unit after it had been subject to a severe rear end collision.
Figure 6:
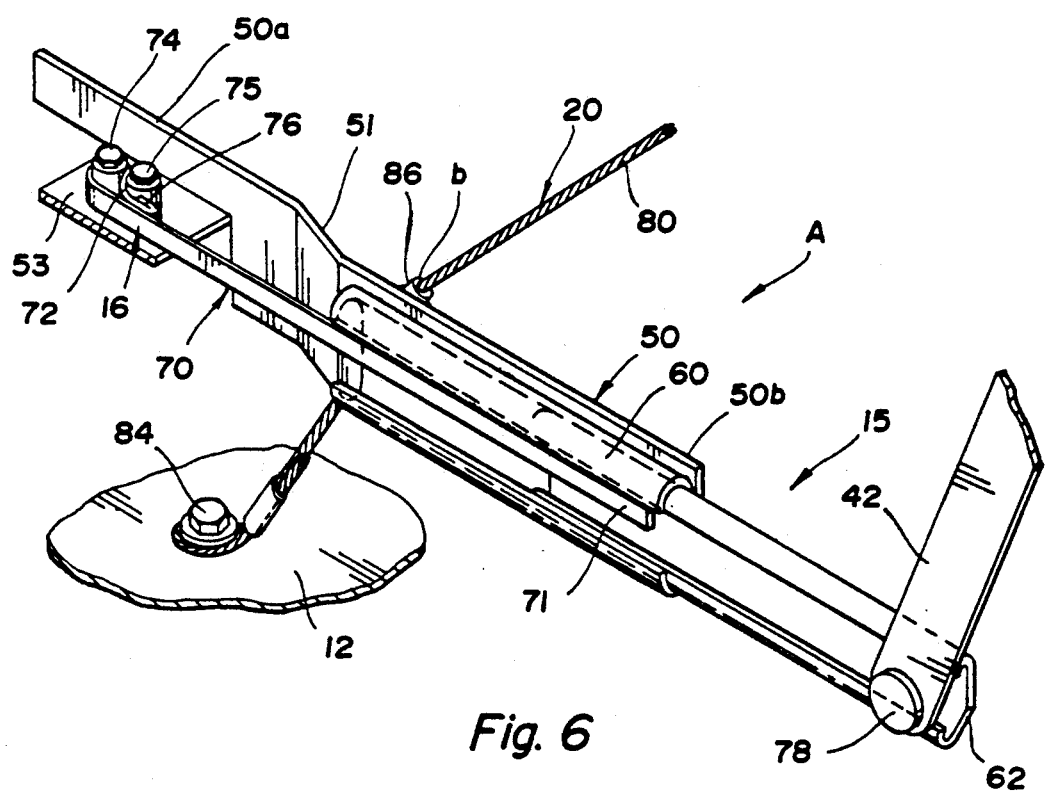
FIG. 6 is a view like that shown in FIG. 5 but showing the position of the energy absorbing means after the vehicle has been subjected to a severe rear end collision.

The operation of the energy absorbing means 16 and the wire retention means 80 will now be described. If the seat assembly A is occupied and the vehicle is subjected to a severe rear end collision, the occupant will tend to move rearwardly and impose a rearward force against the back rest unit 14. If this rearward force by the occupant against the back rest unit 14 is in excess of a predetermined magnitude, i.e., greater than the force resisting movement of the wire strip 70 through the rollers 74, 75 of the energy absorbing means 16 while not causing undue rotation of the seat back unit about the seat back pivot 78 prior to displacement of the back rest unit 14, the back rest unit 14 will move rearwardly from its first or forward position shown in FIGS. 1-3 toward a second position rearwardly of the seat cushion unit 10, as shown in FIG. 4. During this movement, the slide 62 slides rearwardly relative to the channel 60 and the end portion 72 of the metal strip 70 is pulled through the rollers 74, 75. This controlled rearward movement of the back rest unit relative to the seat absorbs energy and can take place until the stop 76 engages the roller 75, as shown in FIG. 6.

As can be seen from FIGS. 3 and 4, when the back rest unit 14 is moved rearwardly relative to the seat cushion unit 10 the pivot 78 moves further away from point b at which the wire 80 extends through the ferrule 86. This in turn causes the distance between points b and c to be increased, which in turn causes the wire 80 to become tauter and pull through or lift up the trim covers 36, 46 until the wire 80 is absolutely taut, as shown in FIG. 4. At this point a triangulated support is formed between the pivot axis 78 and the wire 80 at points b and c that presents any further rearward deflection of the seat back unit 14.

It should be noted that the location of the connection c between the wire 80 and the back rest frame 42 is such that it is located higher than the center of the force the occupant exerts against the back rest so the greater the force the greater the resistance to rearward deflection of the back rest when the wire becomes taut. It should further be understood that the length of the wire 80 will determine the amount of deflection allowed for the back rest unit 14 about the axis of the pivot 78 from its normal upright position in addition to the horizontal rearward movement of the back rest 14. If no or very little deflection is desired the wire 80 is made shorter so that it becomes taut upon the rearward movement of the back rest 14 permitted by the energy absorbing means 16. If the wire 80 becomes taut prior to the full rearward movement of the back rest unit 14 by the energy absorbing means 16 and the back rest unit 14 continues to move rearwardly, the back rest 14 will become more upright and further aid occupant retention. On the other hand, if a greater amount of rearward deflection is to be permitted, such as an additional 20°, the wire 80 can be made longer so that the energy absorption of the back rest pivot displacement reduces the severity of occupant rebound after the crash and lowers any risk of secondary impact within the vehicle. The wire 80 must, however, limit rearward deflection or rotation and become taut before any significant or undue rotation of the last rest occurs which would cause the occupant to ramp off the seat assembly, which can occur at back rest angles greater than a substantial angle from vertical.

Figure 7:
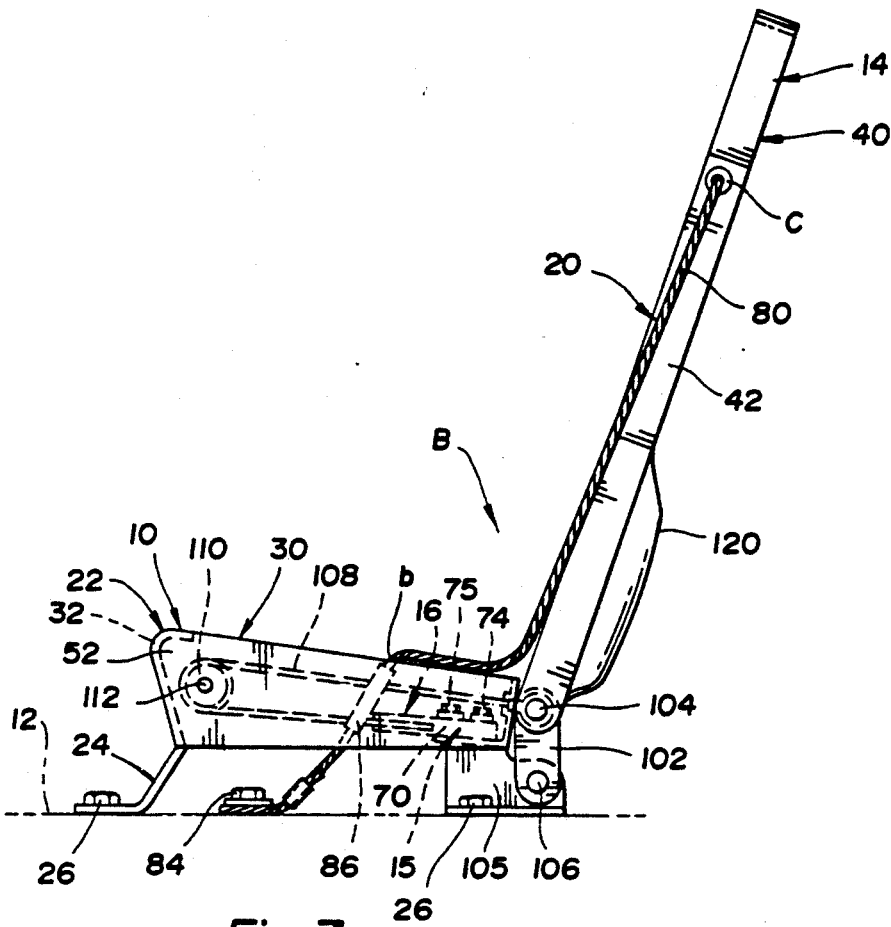
FIG. 7 is a side elevational view of an alternate embodiment of the novel seat assembly of the present invention and showing the back rest unit in its normal upright position.
Figure 8:
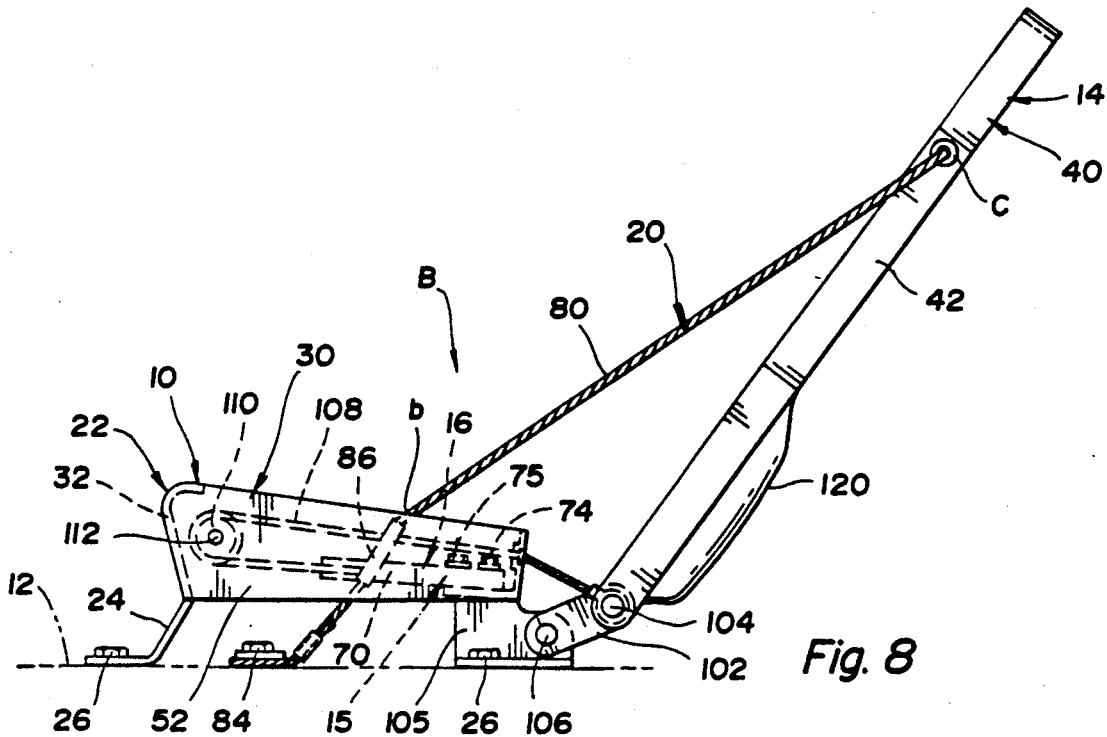
FIG. 8 is a view like that shown in FIG. 7 but showing the position of the back rest unit after the vehicle has been subjected to a severe rear end collision.

FIGS. 7 and 8 show an alternate preferred embodiment of a novel seat assembly B. The seat assembly B is similar to the seat assembly A except for the differences noted hereafter. The parts that are the same will be given the same reference numerals. In this embodiment, the back rest unit 14 is pivotally connected at its lower sides 42 to one end of links or levers 102 via pivot pins or pivot means 104. The links 102 have their other ends pivotally connected to a stationary support 105 of the seat frame 22 via pivots 106. The pivot 104 would preferably be in the form of a rod which extends laterally across the seat at its rear end. The seat assembly B also has an energy absorbing means 15 which is identical to the energy absorbing means 15 previously described in connection with the seat assembly A except that the elongated strip 70 is welded or otherwise connected to one end of a cable 108. The cable 108 is trained around a pulley or roller 110 rotatably mounted on a rod 112 adjacent the forward end of the seat frame 22. The cable 108 has its other end secured to the rod 104.

In operation, when the vehicle is subjected to a severe rear end collision, the back rest unit 14 will move rearwardly relative to the seat cushion unit 10 from its first or normal position, as shown in FIG. 7, toward a second or rearward position, as shown in FIG. 8. This will cause the cable 108 to pull the strip 70 of the energy absorbing means 15 between the rollers 74, 75 for a controlled energy absorption. At the same time, the pivots 104 and levers 102 are caused to be moved in an arcuate or curved path about pivots 106 so that the back rest unit 14 moves both rearwardly and downwardly relative to the seat cushion unit 10 which in turn causes the previously slack wire 80 to become taut, as shown in FIG. 8, which occurs only after the angle formed by the seat back 14 and the levers 102 is greater than 180° by the rearward rotation of levers 102. The levers 102 normally form an angle less than 180° with the seat back 14. This rearward motion causes the levers to rotate over top dead center before the wire 80 becomes taut so that the resulting forces on the back rest assembly 14 aid the further rearward energy absorbing motion of the pivots 102. This will retain the occupant in the seat and prevent further rearward rotation of the seat back unit 14.

In the seat assembly B, the back rest unit 14 has a recessed member 120 extending between the sides 42 which defines a pocket for receiving the buttocks of the occupant in a rear collision to further aid in occupant retention.

Figure 9:
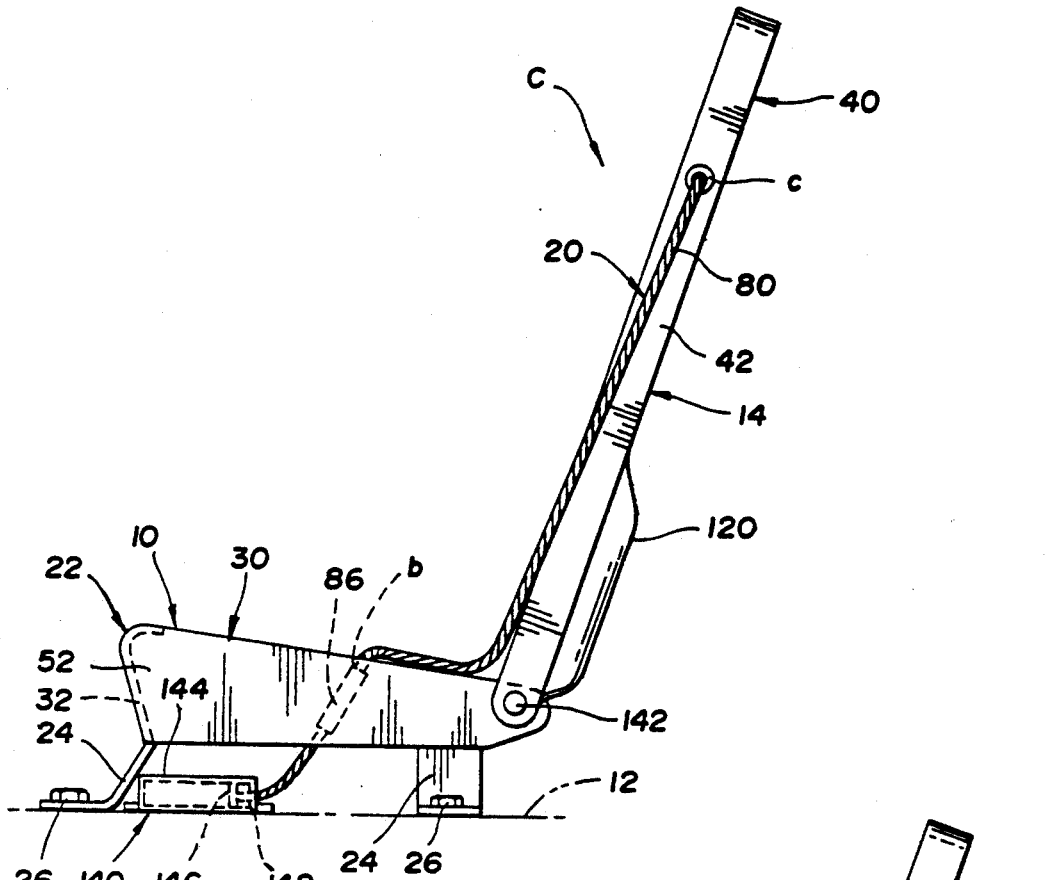
FIG. 9 is a side elevation view of an alternate or third embodiment of the novel seat assembly of the present invention and showing the back rest unit in its normal upright position.
Figure 10:
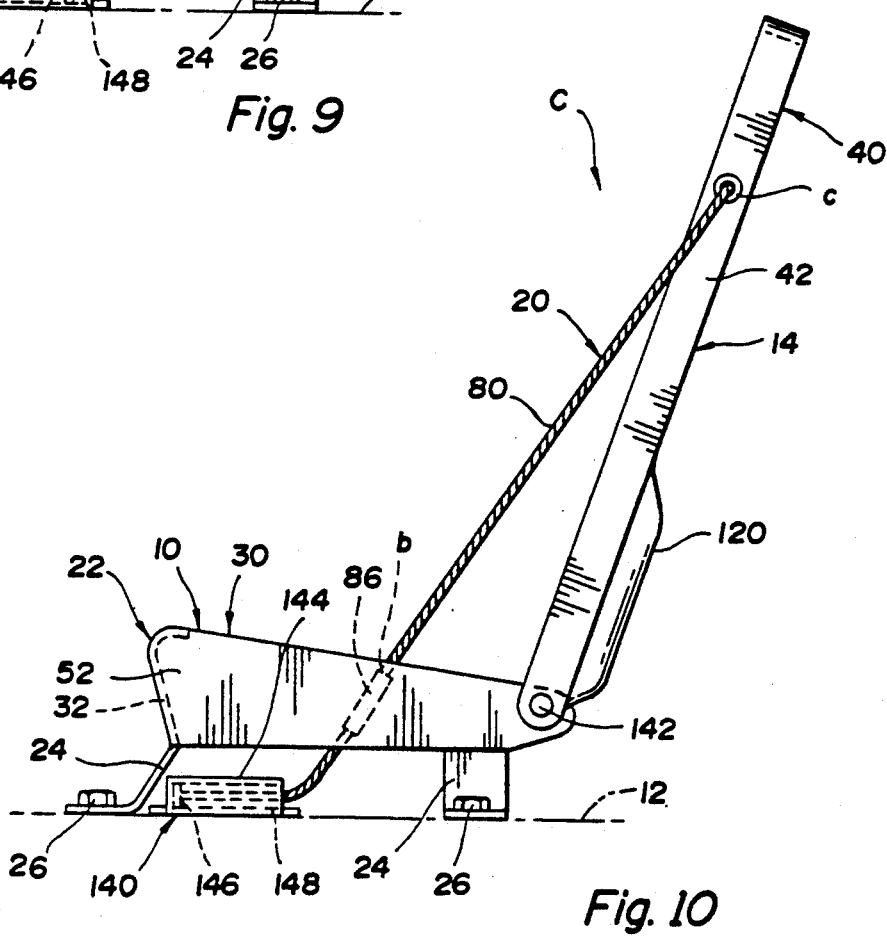
FIG. 10 is a view like that shown in FIG. 9 but showing the position of the back rest unit after the vehicle has been subjected to a severe rear end collision.

FIGS. 9 and 10 show a third or alternate embodiment of a novel seat assembly C of the present invention. The seat assembly B shown in FIGS. 7 and 8 except that it does not employ an energy absorbing means, the back rest unit 14 is directly pivotally connected to the sides 30 of the seat frame 22 and a pyrotechnic or other releasable energy storage device 140 is employed to move the retention wire 80 to a taut position. The parts of the set assembly C which are the same or correspond to the parts of the seat assembly B will be given the same reference numerals.

The back rest unit 14 of the seat assembly C is directly pivotally connected to the sides 30 of the seat frame 22 via a suitable pivot means 142. FIG. 9 shows the back rest unit 14 is in its normal upright position and the retention wire 80 in its normal collapsed condition in which it lies along the sides of the back rest 14 and seat unit 10. However, in this embodiment, the wire at its free ends is not bolted to the floor 12 of the vehicle via bolts 84, but is instead connected to the pyrotechnic device 140. The pyrotechnic device could be of any suitable or conventional construction and is here schematically shown as including a cylinder 144 secured to a fixed support, such as the floor or stationary seat frame of the vehicle, a piston 146 slidable within the cylinder and connected to the free end of the retention wire 80 and a gas generating means 148. When the vehicle experiences a rear end crash in excess of a predetermined magnitude, a sensor (not shown) would cause the gas generating means 148 to be ignited and move the piston 146 from its position shown in FIG. 9 leftward to its position shown in FIG. 10. This movement would cause the retention wire 80 to be moved from its collapsed position shown in FIG. 9 to its taut position, as shown in FIG. 10. The wire 80, when taut, would prevent further rearward movement of the back rest unit 14.

In place of the pyrotechnic device 140, a suitable solenoid operated energy storage device (not shown) could be employed. For example, a cylinder having a spring loaded piston connected to the free end of the wire 80 could be employed. When the piston is released upon actuation of a solenoid, the spring would cause the piston to be moved to pull the wire 80 taut.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

These certain modifications include, but are not limited to, the incorporation of the seat back pivot displacement mechanisms in the construction of the seat frame and energy absorption through deformation of metal in the seat system as part of an integration of the concepts embodied in this novel seat invention into the seat frame stamping or hardware connections comprising the seat assembly.

The embodiments of the invention in which an exclusive property or privilege is claimed are defined as follows:

1. In an automotive vehicle having a floor and a seat assembly supported by said floor, said seat assembly comprising a seat unit having a seat frame and a back rest unit having a back rest frame, support means including energy absorbing means carried by said seat frame and connected with said back rest frame for supporting said back rest unit in a normal upright position and maintaining said back rest unit in a first position relative to said seat unit during usual operating conditions of the vehicle, said energy absorbing means allowing said back rest unit to move rearward relative to said seat unit toward a second position when an occupant imposed rearward load in excess of a predetermined magnitude is imposed thereon in response to the vehicle being crashed into from the rear, and a collapsible retention means attached to one of said seat frame and vehicle floor and connected to said back rest frame, said collapsible retention means being collapsed and lying along the sides of seat frame and back rest unit when said back rest unit is in said one position, said collapsible retention means becoming taut to form a triangulated support between its connections to one of said seat frame and vehicle floor and said back rest and the connection of said back rest frame with said energy absorbing means when said back rest unit is moved from its first position toward its second position by the occupant imposed load during a rearward crash into said vehicle to limit rearward deflection of said back rest unit relative to said seat unit.

2. In an automotive vehicle having a floor and a seat assembly supported by said floor, said seat assembly comprising a seat unit having a seat frame and a back rest unit having a back rest frame, support means including energy absorbing means carried by said seat frame and connected with said back rest frame for supporting said back rest unit in a normal upright position and maintaining said back rest unit in a first position relative to said seat unit during usual operating conditions of the vehicle, said energy absorbing means allowing said back rest unit to move generally horizontally rearward relative to said seat unit toward a second position when an occupant imposed rearward load in excess of a predetermined magnitude is imposed thereon in response to the vehicle being crashed into from the rear, wire retention means attached to one of said seat frame and vehicle floor and connected to said back rest frame at a location above the center of occupant loading against the back rest unit, said wire means being slack and lying along the opposite sides of said seat frame and back rest frame when said back rest unit is in said one position, said wire retention means becoming taut to form a triangulated support between its connections with one of said seat frame and vehicle floor and said back rest frame and the connection of said back rest frame to said energy absorbing means when said back rest unit is moved from its first position toward its second position by the occupant imposed load during a rearward crash into said vehicle to limit rearward deflection of said back rest unit relative to said seat unit.

3. In an automotive vehicle having a floor and a seat assembly supported by said floor, said seat assembly comprising a seat unit and a back rest unit having upper and lower ends, said seat unit including a seat frame having a pair of spaced sides and forward and rearward ends, said back rest unit including a back rest frame having a pair of spaced sides, support means including energy absorbing means carried by the sides of said seat frame for pivotally supporting said back rest unit via a pivot means on said seat frame, said energy absorbing means maintaining said back rest unit in a first position relative to said rearward end of said seat frame during usual operating conditions of the vehicle, said energy absorbing means allowing said pivot means and back rest unit to move rearward relative to said rearward end of said seat frame toward a second position when an occupant imposed rearward load in excess of a predetermined magnitude is imposed thereon in response to the vehicle being crashed into from the rear, wire retention means attached to a fixed support and connected to the sides of said back rest frame at a location above the center of occupant loading against the back rest unit, said wire means being slack and lying along the sides of said seat frame and sides of said back rest frame and normally hidden from view when said back rest unit is in said one position, said wire means becoming taut and forming a triangle between said fixed support, side of back rest frame and said pivot means when said back rest unit is moved from its first position toward its second position by the occupant imposed load during a rearward crash into said vehicle to limit deflection of said back rest unit relative to said seat unit.

4. In an automotive vehicle, as defined in claim 2, and wherein said wire retention means comprises a nylon-coated braided metal wire.

5. In an automotive vehicle, as defined in claim 2, and wherein said wire retention means has its opposite ends attached to said one of said seat unit and floor and is attached to the back rest frame by having an intermediate portion thereof pass through a tube of said back rest frame.

6. In an automotive vehicle, as defined in claim 5, and wherein said seat unit and back rest unit each include a cushion and a trim cover, and wherein said wire is located beneath said trim covers when the back rest unit is in said first position.

7. In an automotive vehicle, as defined in claim 3, and wherein each said support means comprises a generally horizontally disposed channel secured to the side of the seat frame, a slide member slidably supported by said channel and pivotally connected to said back rest frame via said pivot means, and wherein said energy absorbing means comprises a pair of spaced vertically disposed cylindrical rollers carried by said seat frame and an elongated tapered strap having one end secured to said slide member and its other end portion reversely bent and bent around said spaced rollers in a serpentine configuration, said strap maintaining the back rest unit in said first position during usual operating conditions of said vehicle, but being pullable through said rollers to allow said slide member and said back rest unit to move rearward toward its second position when an occupant load in excess of a predetermined magnitude is exerted against the back rest unit.

8. In an automotive vehicle, as defined in claim 3, and wherein said support means comprises a pair of links pivotally connected at one end to said back rest frame via said pivot means, and pivotally connected at its other end to a fixed support, and wherein said energy absorbing means comprises a pair of spaced vertically disposed cylindrical rollers carried by said seat frame, a roller pivotally supported by said seat frame adjacent its front end, a cable having one end connected with said links and trained around said roller, and a strap having one end secured to the other end of said cable and its other end reversely bent and bent around said spaced rollers in a serpentine configuration, said strap maintaining said back rest in said first position during usual operating conditions of said vehicle but being pullable through said rollers by said links via said cable to allow the said pivot means and said links to pivot rearward and said back rest unit to both pivot and horizontally move rearward toward said second position of said back rest when an occupant imposed load in excess of a predetermined magnitude is exerted against the back rest unit.

9. In an automotive vehicle having a floor and a seat assembly supported by said floor, said seat assembly comprising a seat unit having a seat frame and a back rest unit having a back rest frame, support means carried by said seat frame and connected with said back rest frame for supporting said back rest unit in a normal upright position, a collapsible retention wire connected to said seat frame and said back rest frame, said collapsible retention wire being collapsed and normally lying along the sides of said seat frame and back rest unit when said back rest unit is in its normal upright position, and means for causing said retention wire to become taut to form a triangulated support between its opposite end connections and the connection of said back rest frame to said support means carried by said seat frame when said vehicle is subjected to a rearward crash in excess of a predetermined magnitude to limit rearward deflection of said back rest unit relative to said seat unit.

10. In an automotive vehicle, as defined in claim 9, and wherein said means for causing said retention wire to become taut is a device having a movable member connected to a free end of the retention wire and having means for effecting movement of the movable member to pull the retention wire taut when the vehicle is subjected to a rear end collision in excess of a predetermined magnitude.

* * * * *